(12) United States Patent
Shizuno (10) Patent No.: US 11,850,727 B2
(45) Date of Patent: Dec. 26, 2023

(54) AUXILIARY TOOL AND ACTUATION UNIT

(71) Applicant: Ogura & Co., Ltd., Ebina (JP)

(72) Inventor: Satoru Shizuno, Ebina (JP)

(73) Assignee: Ogura & Co., Ltd., Kanagawa (JP)

( * ) Notice: Subject to any disclaimer, the term of this patent is extended or adjusted under 35 U.S.C. 154(b) by 307 days.

(21) Appl. No.: 17/425,561

(22) PCT Filed: Mar. 18, 2019

(86) PCT No.: PCT/JP2019/011195
§ 371 (c)(1),
(2) Date: Jul. 23, 2021

(87) PCT Pub. No.: WO2020/188702
PCT Pub. Date: Sep. 24, 2020

(65) Prior Publication Data
US 2022/0134535 A1 May 5, 2022

(51) Int. Cl.
*B25J 1/00* (2006.01)
(52) U.S. Cl.
CPC ...................... *B25J 1/00* (2013.01)
(58) Field of Classification Search
CPC ... B25J 1/00; B25B 7/04; B25B 7/126; B25B 21/002; A62B 3/005; B21D 5/00
See application file for complete search history.

(56) References Cited

U.S. PATENT DOCUMENTS

| | | | |
|---|---|---|---|
| 4,842,249 A | 6/1989 | Weigand | |
| 4,869,465 A | 9/1989 | Yirmiyahu | |

(Continued)

FOREIGN PATENT DOCUMENTS

| | | |
|---|---|---|
| JP | H10118991 | 5/1998 |
| JP | H11216679 A | 8/1999 |

(Continued)

OTHER PUBLICATIONS

International Search Report PCT/JP2019/011195 dated Jun. 11, 2019.

(Continued)

*Primary Examiner* — Stephen A Vu
(74) *Attorney, Agent, or Firm* — Renner, Kenner; Edward G. Greive (57) ABSTRACT

An auxiliary tool to be detachably attached to tip portions (36, 46) of a pair of arms (30, 40) which are opened/closed by each rotating relative to a base (24) of an actuation device (e.g., hydraulic actuation device (10)), includes a first auxiliary member (60) to be detachably attached to a first arm (30) of the pair of arms (30, 40), the first auxiliary member (60) having at least one claw portion (62), and a second auxiliary member (70) to be detachably attached to a second arm (40) of the pair of arms (30, 40), the second auxiliary member (70) having at least one claw portion (72). Positions of the claw portion (62) of the first auxiliary member (60) and the claw portion (72) of the second auxiliary member (70) are such positions that the claw portion (62) of the first auxiliary member (60) and the claw portion (72) of the second auxiliary member (70) do not come into contact with each other even when the arms (30, 40) are closed in a state in which the first auxiliary member (60) is attached to the first arm (30) and the second auxiliary member (70) is attached to the second arm (40).

3 Claims, 11 Drawing Sheets

(56) References Cited

U.S. PATENT DOCUMENTS

| | | | | |
|---|---|---|---|---|
| 5,105,543 A | * | 4/1992 | Maarschalk | A62B 3/005 30/135 |
| 6,000,680 A | | 12/1999 | Kimura | |
| 9,517,364 B2 | | 12/2016 | Herwig et al. | |
| 2016/0144205 A1 | | 5/2016 | Herwig et al. | |
| 2018/0021603 A1 | | 1/2018 | Horne et al. | |
| 2018/0264563 A1 | | 9/2018 | Frenken | |

FOREIGN PATENT DOCUMENTS

| | | | | |
|---|---|---|---|---|
| JP | 2002-187089 A | | 12/2000 | |
| JP | 2002187089 | | 12/2000 | |
| JP | 2002-335839 A | | 11/2002 | |
| JP | 2002335839 A | | 11/2002 | |
| JP | 2010280011 | | 12/2010 | |
| WO | WO-2011100655 A2 | * | 8/2011 | A62B 3/005 |
| WO | WO-2015003198 A1 | * | 1/2015 | A62B 3/005 |
| WO | WO-2016119819 A1 | * | 8/2016 | A62B 3/005 |

OTHER PUBLICATIONS

First Office Action from China for Chinese Application No. 201910358839.5 dated Jun. 14, 2022.
Extended European Search Report for PCT/JP2019011195 dated Aug. 16, 2022.

* cited by examiner

AUXILIARY TOOL AND ACTUATION UNIT

TECHNICAL FIELD

The present invention relates to an auxiliary tool to be detachably attached to tip portions of a pair of arms which are opened/closed by each rotating relative to a base of an actuation device, and an actuation unit provided with such an auxiliary tool.

BACKGROUND ART

Conventionally, as a life-saving device (rescue device) for conducting a rescue by bending an object such as a metal plate on a door side surface of a vehicle, a portable hydraulic actuation device having a pair of arms which are opened/closed by each rotating relative to a base, has been used. As such a hydraulic actuation device, there has been known an example described in Japanese Laid-Open Patent Publication No. 2010-280011 (JP2010-280011A), etc. The hydraulic actuation device disclosed in Japanese Laid-Open Patent Publication No. 2010-280011 includes a hydraulic pressure generating unit having a battery, an electric motor supplied with power from the battery, and a hydraulic pump driven by the electric motor, and a head unit attachable and detachable to and from the hydraulic pressure generating unit and having a tip tool driven by pressure oil generated by the hydraulic pressure generating unit. As the tip tool to be provided to the head unit, various types of tools such as a cutter and a spreader are prepared, and it is possible to adapt to a wide variety of works by replacing the head unit.

SUMMARY OF THE INVENTION

In a case of bending an object such as a metal plate on a door side surface of a vehicle by the hydraulic actuation device as a life-saving device, if the surface of the object is smooth, the tip portions of the arms of the hydraulic actuation device slide on the object, and thus it might be impossible to grasp the object by the tip portions of the pair of arms. At this time, if the pair of arms move in closing directions, the hydraulic actuation device itself moves in a direction away from the object, so that the object cannot be grasped by the tip portions of the pair of arms. Thus, it might become impossible to bend the object.

The present invention has been made in view of the above circumstances, and an object of the present invention is to provide an auxiliary tool and an actuation system that are capable of bending an object even when the surface of the object is smooth.

An auxiliary tool of the present invention is an auxiliary tool to be detachably attached to tip portions of a pair of arms which are opened/closed by each rotating relative to a base of an actuation device, the auxiliary tool comprising: a first auxiliary member to be detachably attached to a first arm of the pair of arms, the first auxiliary member having at least one claw portion; and a second auxiliary member to be detachably attached to a second arm of the pair of arms, the second auxiliary member having at least one claw portion, wherein positions of the claw portion of the first auxiliary member and the claw portion of the second auxiliary member are such positions that the claw portion of the first auxiliary member and the claw portion of the second auxiliary member do not come into contact with each other even when the arms are closed in a state in which the first auxiliary member is attached to the first arm and the second auxiliary member is attached to the second arm.

In the auxiliary tool of the present invention, the claw portion of the first auxiliary member and the claw portion of the second auxiliary member may respectively protrude so as to extend in directions in which the corresponding arms are closed.

In the auxiliary tool of the present invention, the first auxiliary member and the second auxiliary member may be each made from a frictional material.

In the auxiliary tool of the present invention, the first auxiliary member may have a pair of the claw portions located so as to be away from each other, and positions of the claw portions of the first auxiliary member and the claw portion of the second auxiliary member may be such positions that the claw portion of the second auxiliary member enters a recess formed between the pair of claw portions of the first auxiliary member when the pair of arms are closed in a state in which the first auxiliary member is attached to the first arm and the second auxiliary member is attached to the second arm.

In the auxiliary tool of the present invention, attachment holes may be formed in the tip portions of the pair of arms, an attachment pin having an insertion portion to be inserted into the attachment hole may be provided to the first auxiliary member, and an attachment pin having an insertion portion to be inserted into the attachment hole may be provided to the second auxiliary member.

An actuation unit of the present invention comprises an actuation device having a base and a pair of arms which are opened/closed by each rotating relative to the base; and an auxiliary tool to be detachably attached to tip portions of the pair of arms of the actuation device, wherein the auxiliary tool includes a first auxiliary member to be detachably attached to a first arm of the pair of arms, the first auxiliary member having at least one claw portion, and a second auxiliary member to be detachably attached to a second arm of the pair of arms, the second auxiliary member having at least one claw portion, and positions of the claw portion of the first auxiliary member and the claw portion of the second auxiliary member are such positions that the claw portion of the first auxiliary member and the claw portion of the second auxiliary member do not come into contact with each other even when the arms are closed in a state in which the first auxiliary member is attached to the first arm and the second auxiliary member is attached to the second arm.

DESCRIPTION OF THE PREFERRED EMBODIMENTS

Figure 12:
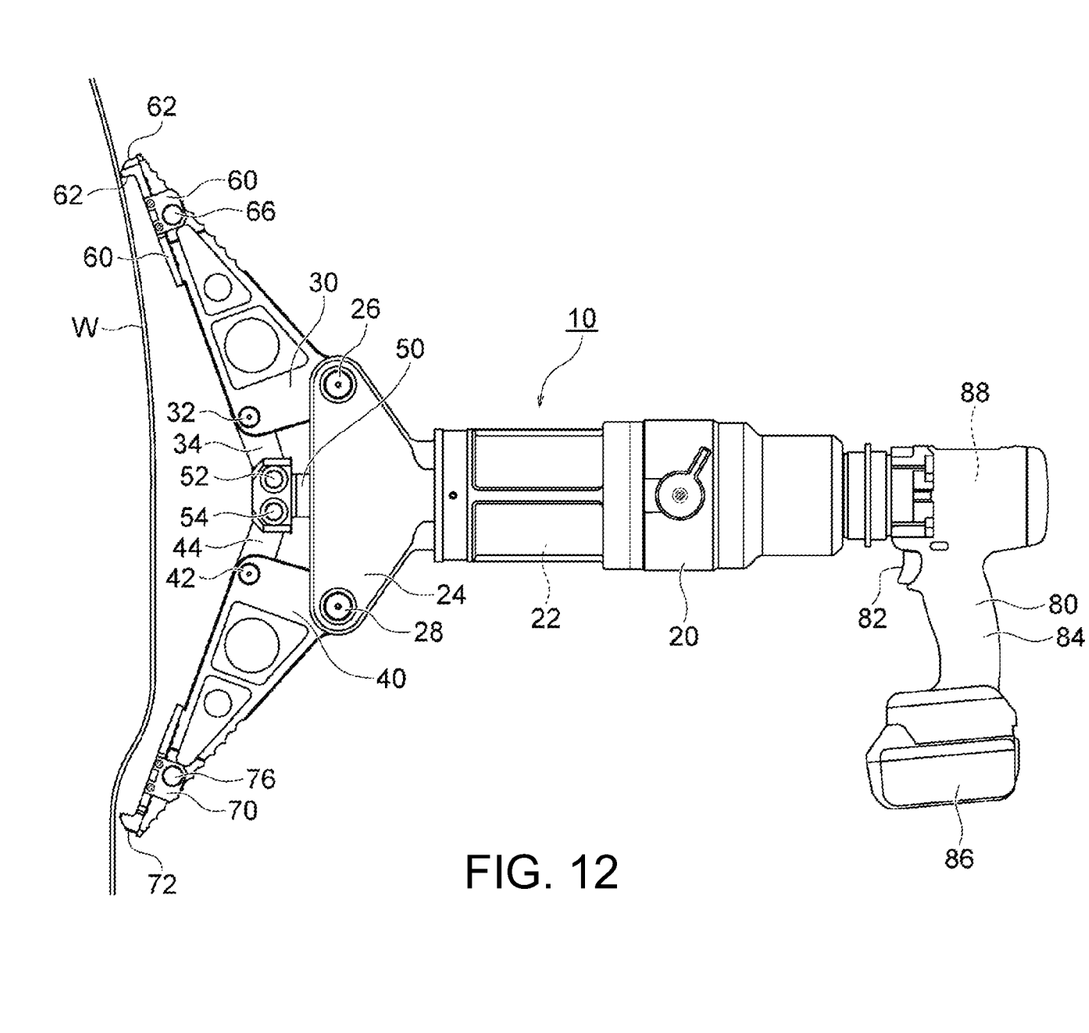
FIG. 12 is a side view showing a state before an object is bent by the hydraulic actuation device for which the first auxiliary member and the second auxiliary member are respectively attached to the tips of the pair of arms.
Figure 13:
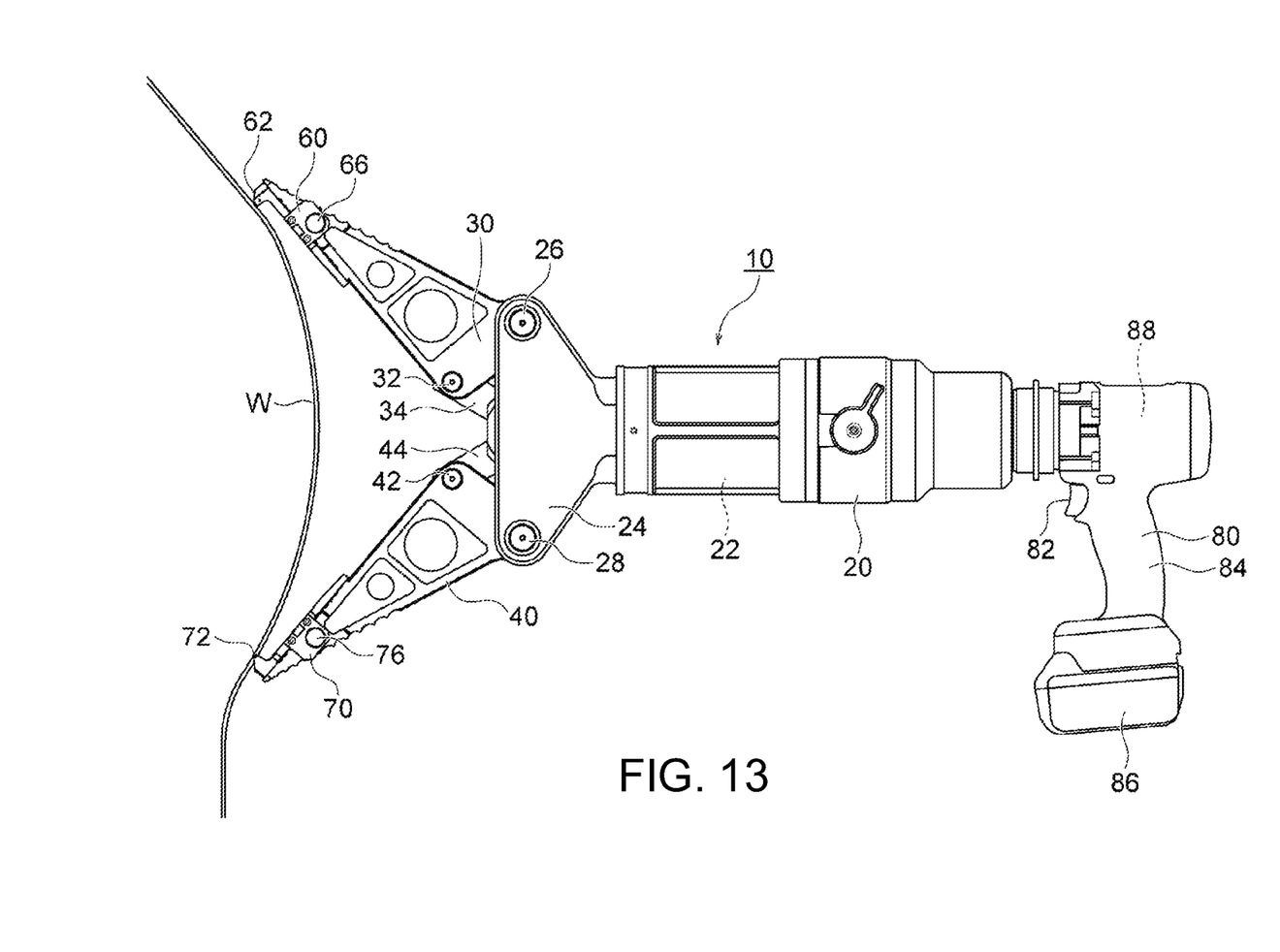
FIG. 13 is a side view showing a state during bending of the object by the hydraulic actuation device for which the first auxiliary member and the second auxiliary member are respectively attached to the tips of the pair of arms.
Figure 14:
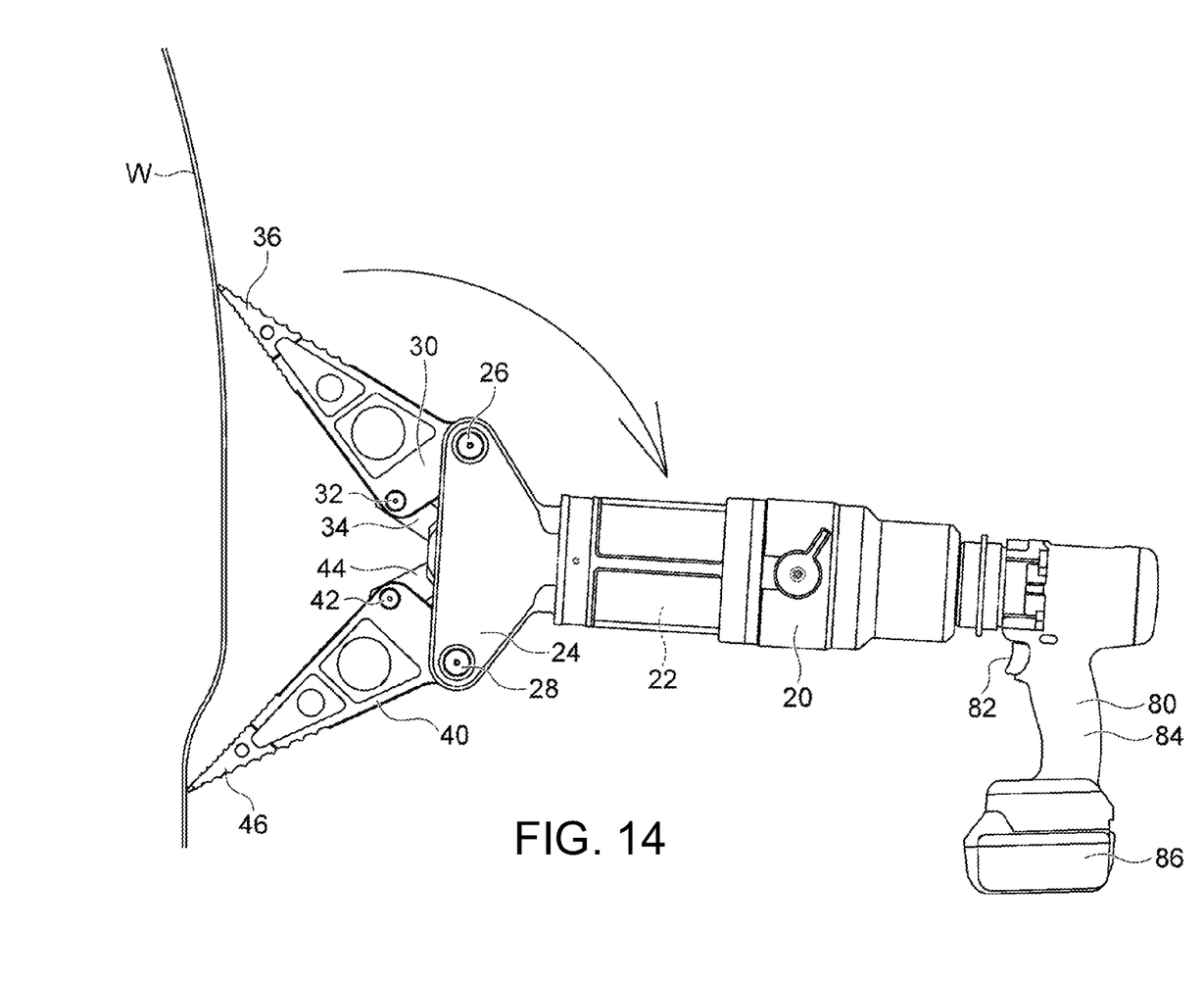
FIG. 14 is a side view showing a state before the object is bent by the hydraulic actuation device for which the first auxiliary member and the second auxiliary member are not respectively attached to the tips of the pair of arms.
Figure 15:
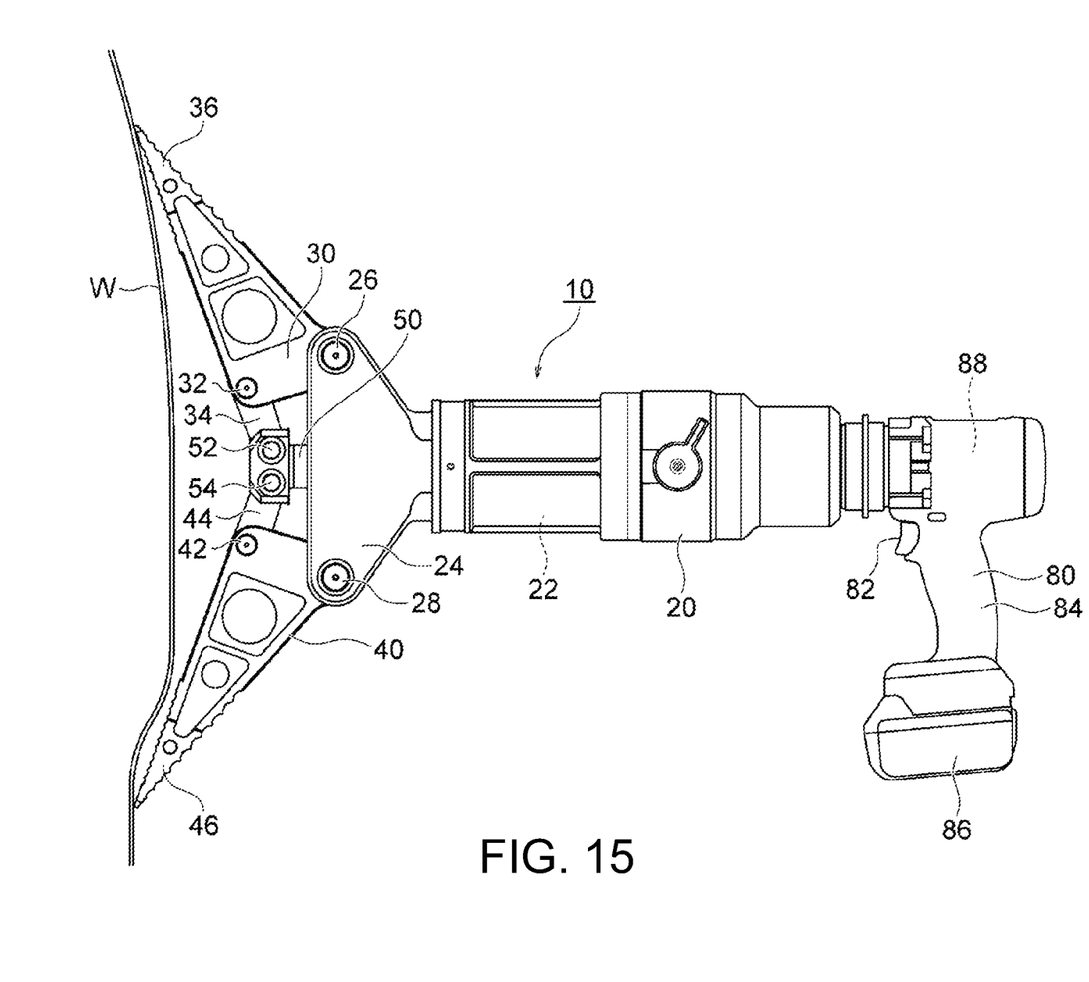
FIG. 15 is a side view showing a state in which the object cannot be bent by the hydraulic actuation device for which the first auxiliary member and the second auxiliary member are not respectively attached to the tips of the pair of arms.

Hereinafter, an embodiment of the present invention will be described with reference to the drawings. A hydraulic actuation device according to the present embodiment is a life-saving device for conducting a rescue by opening/closing a pair of arms and bending an object such as a metal plate on a door side surface of a vehicle. FIG. 1 to FIG. 11 are views showing the hydraulic actuation device according to the present embodiment, and a first auxiliary member and a second auxiliary member to be respectively attached to the pair of arms of the hydraulic actuation device. In addition, FIG. 12 and FIG. 13 are side views showing a state at the time of bending the object by the hydraulic actuation device for which the first auxiliary member and the second auxiliary member are respectively attached to tip of the pair of arms. On the other hand, FIG. 14 and FIG. 15 are side views showing a state at the time of bending the object by the hydraulic actuation device for which the first auxiliary member and the second auxiliary member are not respectively attached to the tip of the pair of arms. In FIG. 12 to FIG. 15, the object to be bent by the hydraulic actuation device is denoted by reference character W.

Figure 1:
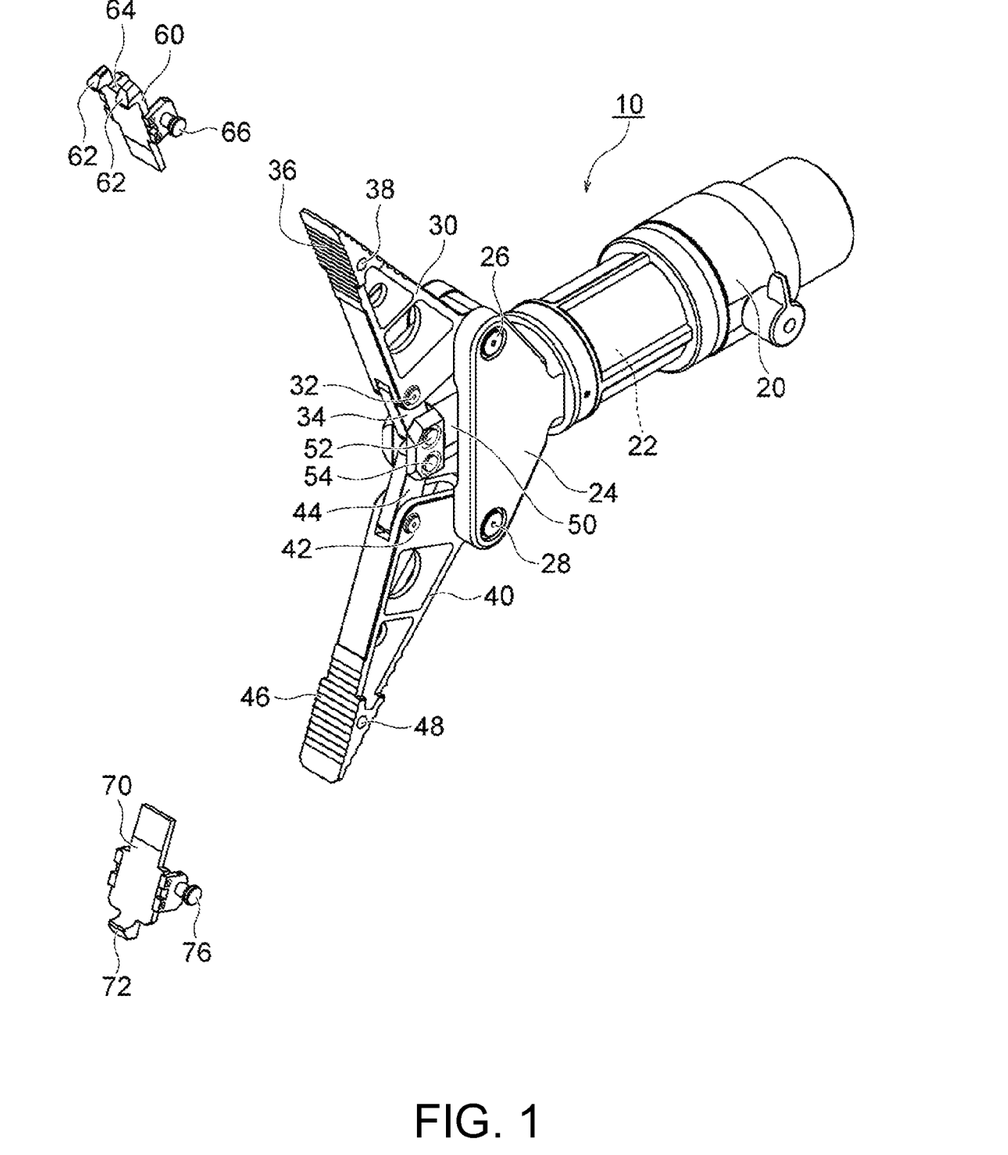
FIG. 1 is a perspective view showing a state in which a first auxiliary member and a second auxiliary member are not attached to tips of a pair of arms of a hydraulic actuation device, according to an embodiment of the present invention.

First, the structure of the hydraulic actuation device according to the present embodiment will be described with reference to FIG. 1, FIG. 12, etc. A hydraulic actuation device 10 shown in FIG. 1 includes a cylindrical body 20 having a hydraulic pump 22 therein, a base 24 provided at an end of the body 20, and a pair of arms 30, 40 respectively attached to the base 24. Here, the first arm 30 is rotatable about a shaft 26 relative to the base 24. In addition, the second arm 40 is rotatable about a shaft 28 relative to the base 24.

A piston member 50 is provided inside the base 24. The piston member 50 performs reciprocating movement in the left-right direction in FIG. 3 by pressure oil being sent from the hydraulic pump 22 provided in the body 20. In addition, a first connection member 34 and a second connection member 44 are each connected to an end of the piston member 50. The first connection member 34 is rotatable about a shaft 52 relative to the piston member 50. Further, the first connection member 34 is rotatable about a shaft 32 relative to the first arm 30. Thus, when the piston member 50 performs reciprocating movement, the first connection member 34 is drawn to the body 20 side or pushed out from the body 20 side by the piston member 50, whereby the first arm 30 rotates about the shaft 26 relative to the base 24.

Meanwhile, the second connection member 44 is rotatable about a shaft 54 relative to the piston member 50. Further, the second connection member 44 is rotatable about a shaft 42 relative to the second arm 40. Thus, when the piston member 50 performs reciprocating movement, the second connection member 44 is drawn to the body 20 side or pushed out from the body 20 side by the piston member 50, whereby the second arm 40 rotates about the shaft 28 relative to the base 24.

Figure 2:
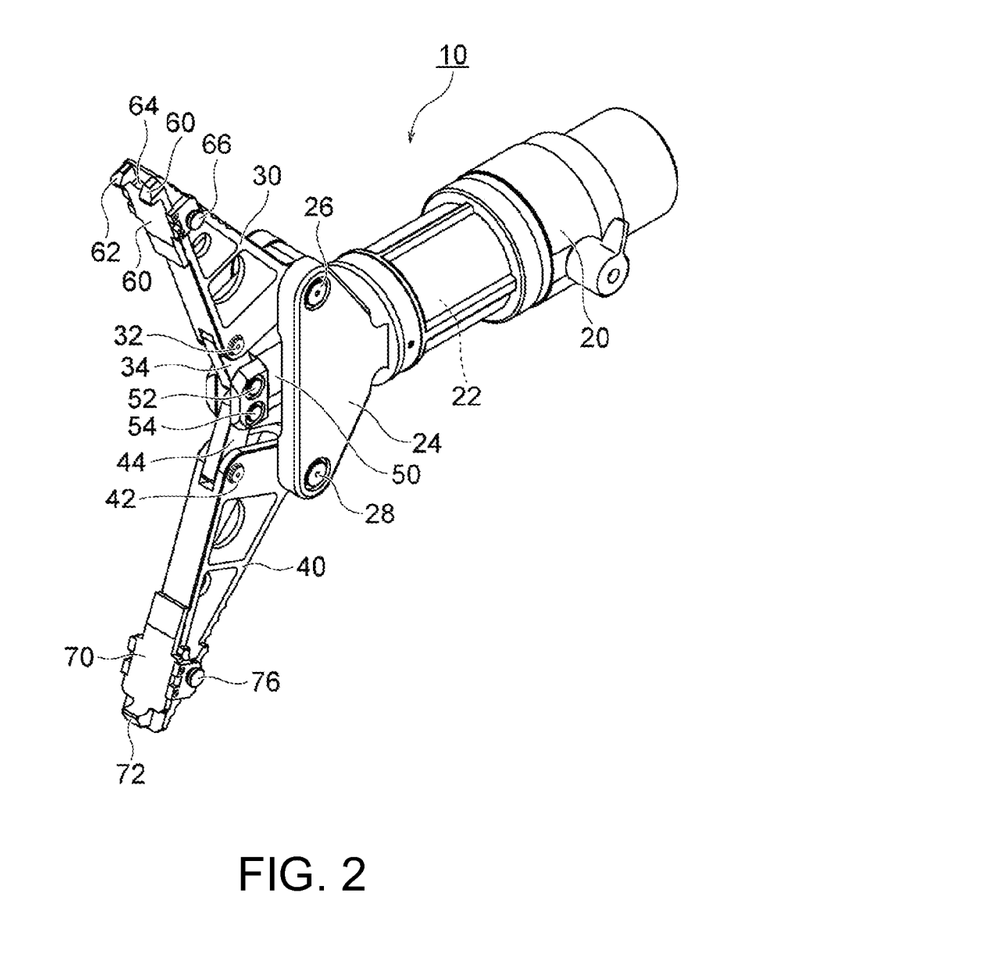
FIG. 2 is a perspective view showing a state in which the first auxiliary member and the second auxiliary member shown in FIG. 1 are respectively attached to the tips of the pair of arms of the hydraulic actuation device.
Figure 3:
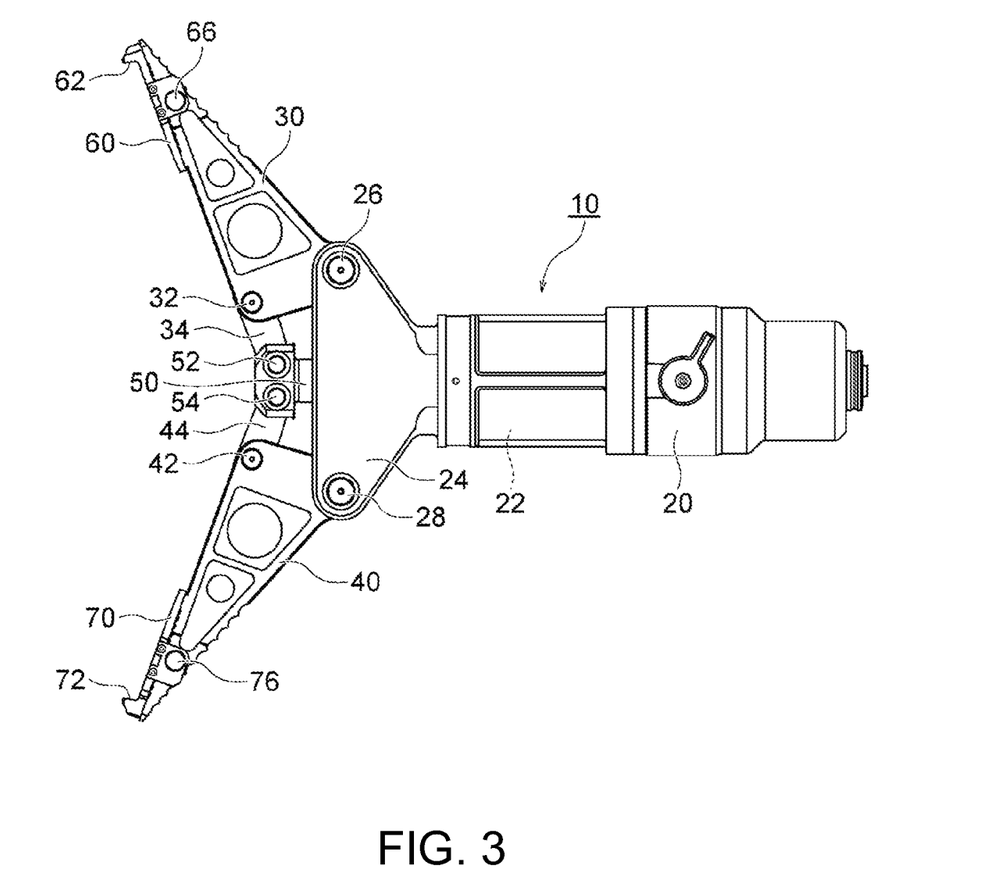
FIG. 3 is a side view of the hydraulic actuation device, the first auxiliary member, and the second auxiliary member shown in FIG. 2.
Figure 4:
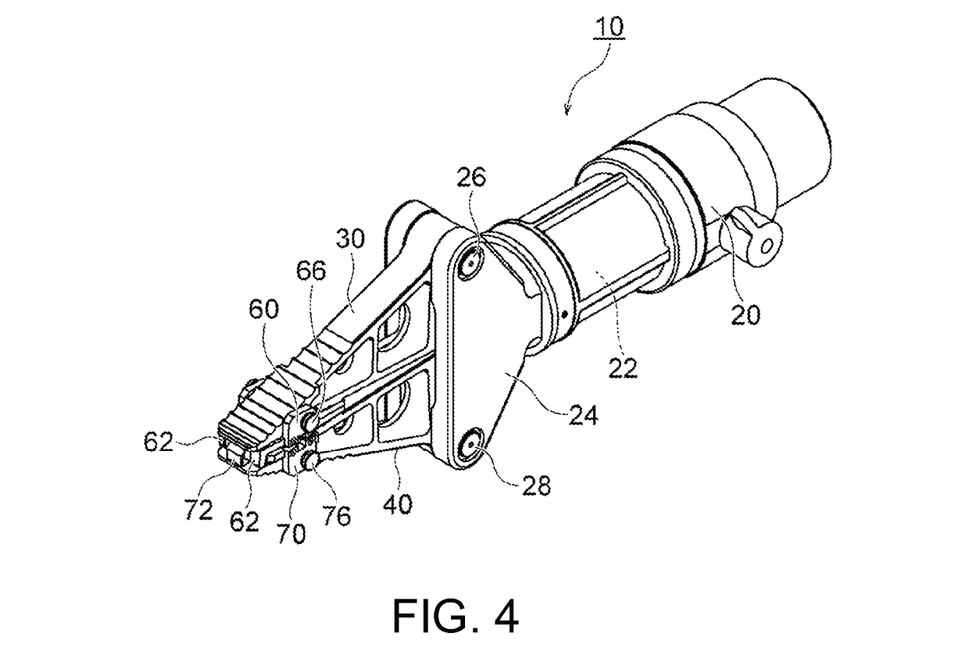
FIG. 4 is a perspective view showing a state in which the pair of arms of the hydraulic actuation device shown in FIG. 2 are closed.
Figure 5:
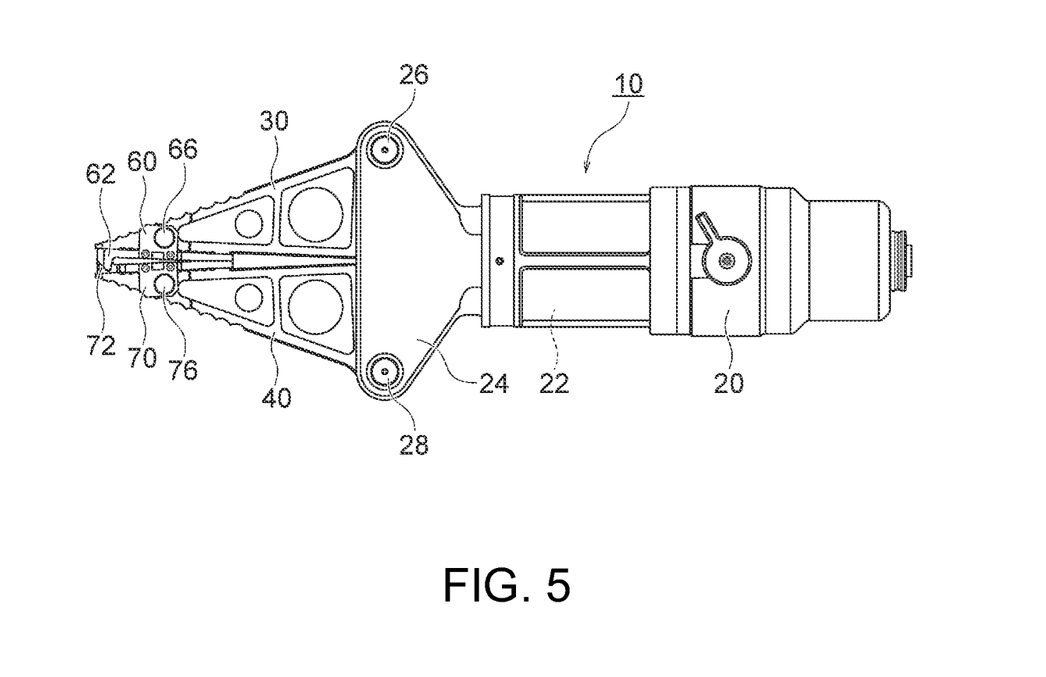
FIG. 5 is a side view of the hydraulic actuation device, the first auxiliary member, and the second auxiliary member shown in FIG. 4.

A tip portion 36 having recesses and projections in a corrugated shape thereon is formed at a tip of the first arm 30. A pair of attachment holes 38 are formed in the tip portion 36. In FIG. 1, etc., only one attachment hole 38 is shown, but another attachment hole 38 is formed also on the back side of the tip portion 36 in FIG. 1. In addition, a tip portion 46 having recesses and projections in a corrugated shape thereon is formed at a tip of the second arm 40. A pair of attachment holes 48 are formed in the tip portion 46. In FIG. 1, etc., only one attachment hole 48 is shown, but another attachment hole 48 is formed also on the back side of the tip portion 46 in FIG. 1. These tip portions 36, 46 are made from metal such as cast iron, for example. When the pair of arms 30, 40 are closed, the object is grasped between the pair of tip portions 36, 46, whereby the object can be bent or crushed. FIG. 1 to FIG. 3 are perspective views and a side view showing a state in which the pair of arms 30, 40 are opened, and FIG. 4 and FIG. 5 are a perspective view and a side view showing a state in which the pair of arms 30, 40 are closed.

As shown in FIG. 12, etc., an operation unit 80 can be detachably attached to the body 20. The operation unit 80 has a grip portion 84 to be gripped by a worker's hand, a switch 82 to be operated by the finger of the worker gripping the grip portion 84 by the hand, a motor 88 such as an electric motor, and a battery 86 formed from a secondary battery such as a lithium ion battery or a nickel metal hydride battery. When the operation unit 80 is attached to the body 20, if the worker operates the switch 82 to drive the motor 88, the hydraulic pump 22 is driven by the motor 88, whereby the piston member 50 performs reciprocating movement in the left-right direction in FIG. 3.

The hydraulic actuation device 10 of the present embodiment is configured such that the first auxiliary member 60 can be attached to the tip portion 36 of the first arm 30 and the second auxiliary member 70 can be attached to the tip portion 46 of the second arm 40. Here, FIG. 1 is a perspective view showing a state in which the first auxiliary member 60 and the second auxiliary member 70 are not respectively attached to the tips of the pair of arms 30, 40 of the hydraulic actuation device 10, and FIG. 2 is a perspective view showing a state in which the first auxiliary member 60 and the second auxiliary member 70 are respectively attached to the tips of the pair of arms 30, 40 of the hydraulic actuation device 10. As the first auxiliary member 60 and the second auxiliary member 70, for example, a frictional material such as rubber or metal (e.g., iron or steel) which causes a great frictional force between the material and the object is used.

Figure 6:
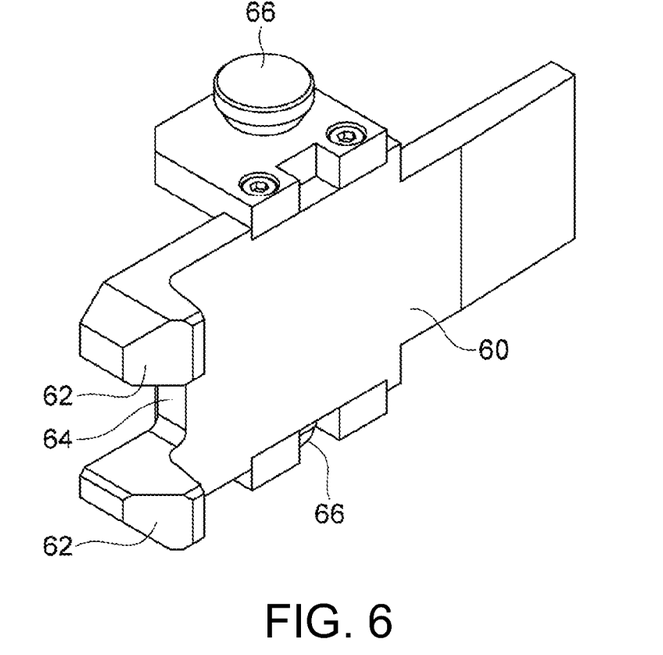
FIG. 6 is a perspective view of the first auxiliary member shown in FIG. 1, etc.
Figure 7:
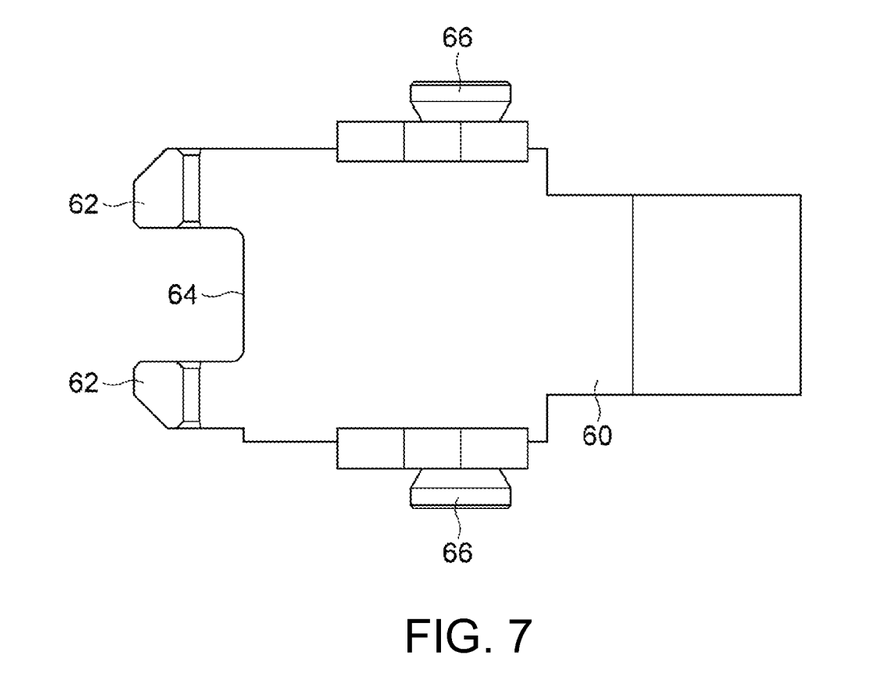
FIG. 7 is a front view of the first auxiliary member shown in FIG. 6.
Figure 8:
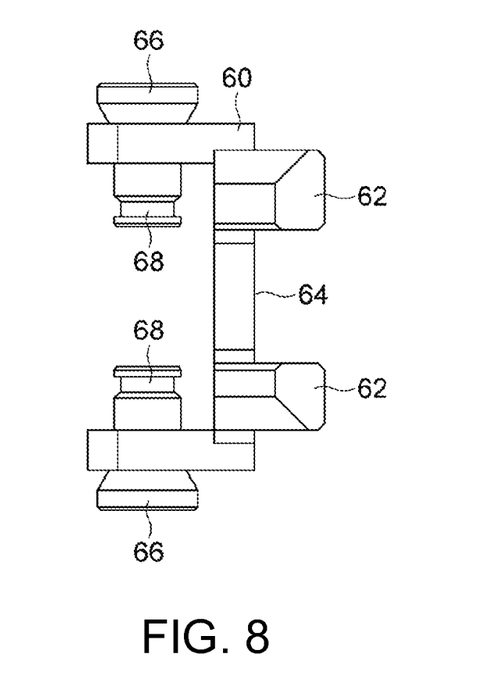
FIG. 8 is a side view of the first auxiliary member shown in FIG. 6.
Figure 9:
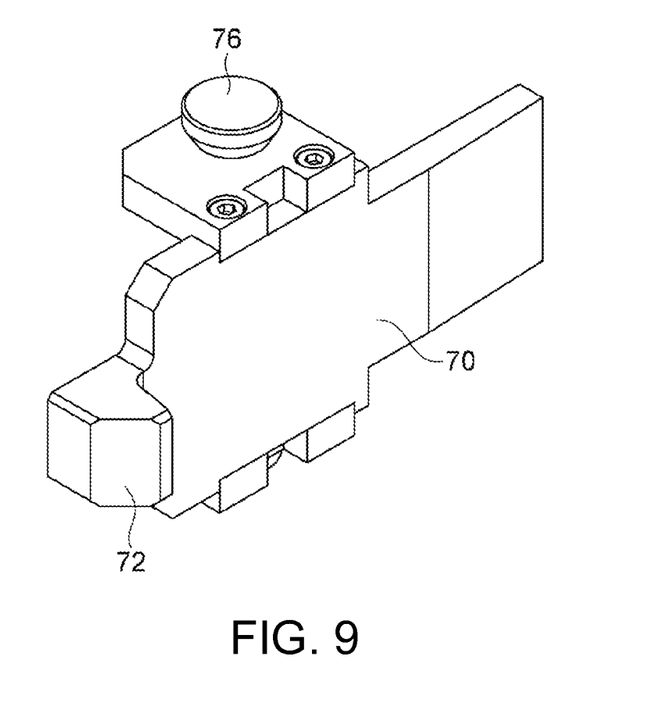
FIG. 9 is a perspective view of the second auxiliary member shown in FIG. 1, etc.

The details of the structures of the first auxiliary member 60 and the second auxiliary member 70 will be described with reference to FIG. 6 to FIG. 11. FIG. 6 is a perspective view of the first auxiliary member 60, and FIG. 7 and FIG. 8 are a front view and a side view of the first auxiliary member 60 shown in FIG. 6, respectively. FIG. 9 is a perspective view of the second auxiliary member 70 shown in FIG. 1, etc., and FIG. 10 and FIG. 11 are a front view and a side view of the second auxiliary member 70 shown in FIG. 9, respectively.

As shown in FIG. 6 to FIG. 8, the first auxiliary member 60 has a pair of claw portions 62, a recess 64 formed between the pair of claw portions 62, and a pair of attachment pins 66. The claw portions 62 are respectively provided at positions near both ends in the width direction (up-down direction in FIG. 6 to FIG. 8) of the first auxiliary member 60. Further, each claw portion 62 protrudes so as to extend in the direction in which the first arm 30 is closed (i.e., lower left direction in FIG. 3). The recess 64 is located at the center in the width direction of the first auxiliary member 60. The attachment pins 66 respectively have insertion portions 68 to be inserted into the pair of attachment holes 38 of the tip portion 36 of the first arm 30. In more detail, a pin and a spring (not shown) for preventing dropping are attached to each attachment pin 66. At the time of attaching the first auxiliary member 60 to the tip portion 36 of the first arm 30, the worker holds the respective attachment pins 66 by the fingers, to move the insertion portions 68 of the attachment pins 66 away from each other, and then fits the first auxiliary member 60 to the tip portion 36 of the first arm 30. Then, the insertion portions 68 of the attachment pins 66 are respectively inserted into the attachment holes 38 of the tip portion 36. This ensures that the first auxiliary member 60 does not come off from the tip portion 36 of the first arm 30.

Figure 10:
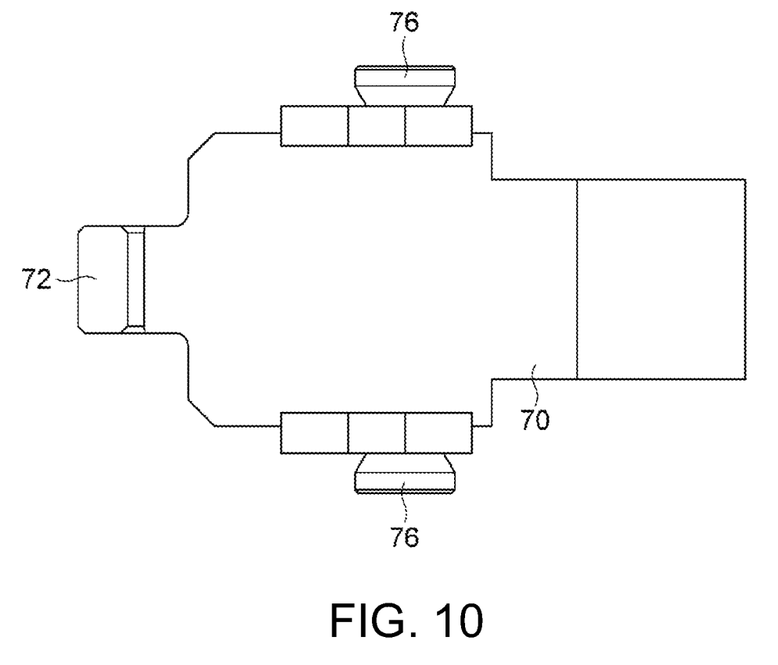
FIG. 10 is a front view of the second auxiliary member shown in FIG. 9.
Figure 11:
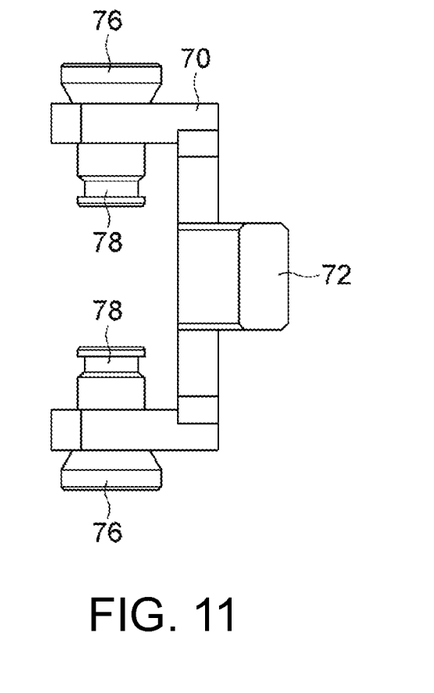
FIG. 11 is a side view of the second auxiliary member shown in FIG. 9.

As shown in FIG. 9 to FIG. 11, the second auxiliary member 70 has one claw portion 72 and a pair of attachment pins 76. The claw portion 72 is located at the center in the width direction (up-down direction in FIG. 9 to FIG. 11) of the second auxiliary member 70. Further, the claw portion 72 protrudes so as to extend in the direction in which the second arm 40 is closed (i.e., upper left direction in FIG. 3). The attachment pins 76 respectively have insertion portions 78 to be inserted into the pair of attachment holes 48 of the tip portion 46 of the second arm 40. In more detail, a pin and a spring (not shown) for preventing dropping are attached to each attachment pin 76. At the time of attaching the second auxiliary member 70 to the tip portion 46 of the second arm 40, the worker holds the attachment pins 76 by the fingers, to move the insertion portions 78 of the attachment pins 76 away from each other, and then fits the second auxiliary member 70 to the tip portion 46 of the second arm 40. Then, the insertion portions 78 of the attachment pins 76 are respectively inserted into the attachment holes 48 of the tip portion 46. This ensures that the second auxiliary member 70 does not come off from the tip portion 46 of the second arm 40.

In the present embodiment, as shown in FIG. 4 and FIG. 5, when the pair of arms 30, 40 are closed, the claw portion 72 of the second auxiliary member 70 enters the recess 64 formed between the pair of claw portions 62 of the first auxiliary member 60. This can prevent the claw portion 72 of the second auxiliary member 70 and each claw portion 62 of the first auxiliary member 60 from hitting each other when the pair of arms 30, 40 are closed.

In the present embodiment, the first auxiliary member 60 and the second auxiliary member 70 are combined to form an auxiliary tool to be detachably attached to the tip portions of the pair of arms 30, 40 which are opened/closed by each rotating relative to the base 24 of the hydraulic actuation device 10. In addition, in the present embodiment, the hydraulic actuation device 10, the first auxiliary member 60, and the second auxiliary member 70 are combined to form the actuation system.

Next, operation of deforming the object W such as the metal plate on the door side surface of the vehicle by the hydraulic actuation device 10 for which the first auxiliary member 60 and the second auxiliary member 70 are respectively attached to the tips of the pair of arms 30, 40, will be described with reference to FIG. 12 and FIG. 13. FIG. 12 is a side view showing a state before the object W such as the metal plate is bent by the hydraulic actuation device 10 for which the first auxiliary member 60 and the second auxiliary member 70 are respectively attached to the tips of the pair of arms 30, 40, and FIG. 13 is a side view showing a state during bending of the object W by the above hydraulic actuation device 10.

To bend the object W such as the metal plate by the hydraulic actuation device 10, first, as shown in FIG. 2 and FIG. 3, the first auxiliary member 60 and the second auxiliary member 70 are attached to the tips of the pair of arms 30, 40 of the hydraulic actuation device 10. Next, as shown in FIG. 12, with the pair of arms 30, 40 opened, the pair of claw portions 62 of the first auxiliary member 60 and the claw portion 72 of the second auxiliary member 70 are brought close to or brought into contact with the object W. Then, the worker grips the grip portion 84 by the hand and operates the switch 82 by the finger of the hand gripping the grip portion 84. Thus, the motor 88 is driven and the hydraulic pump 22 is driven by the motor 88, whereby the piston member 50 is moved in the left direction in FIG. 3 and FIG. 12. When the piston member 50 is moved in the left direction in FIG. 3 and FIG. 12, the first connection member 34 is drawn in the left direction in FIG. 3 and FIG. 12 (i.e., to the body 20 side) by the piston member 50, whereby the first arm 30 rotates in the counterclockwise direction in FIG. 3 and FIG. 12 about the shaft 26 relative to the base 24. In addition, when the piston member 50 is moved in the left direction in FIG. 3 and FIG. 12, the second connection member 44 is drawn in the left direction in FIG. 3 and FIG. 12 (i.e., to the body 20 side) by the piston member 50, whereby the second arm 40 rotates in the clockwise direction in FIG. 3 and FIG. 12 about the shaft 28 relative to the base 24. Thus, as shown in FIG. 13, the arms 30, 40 are moved in the closing directions (i.e., directions to come close to each other).

Here, in the present embodiment, the first auxiliary member 60 attached to the tip portion 36 of the first arm 30 and the second auxiliary member 70 attached to the tip portion 46 of the second arm 40 are in contact with the object W. Thus, even when the arms 30, 40 are moved in the closing directions, the first auxiliary member 60 and the second auxiliary member 70 do not slide on the object W, and the claw portions 62 of the first auxiliary member 60 and the claw portion 72 of the second auxiliary member 70 grasp the object W, whereby the object W can be bent as shown in FIG. 13.

For comparison, operation of deforming the object by the hydraulic actuation device 10 for which the first auxiliary member 60 and the second auxiliary member 70 are not respectively attached to the tips of the pair of arms 30, 40, will be described with reference to FIG. 14 and FIG. 15. FIG. 14 is a side view showing a state before the object W such as the metal plate is bent by the hydraulic actuation device 10 for which the first auxiliary member 60 and the second auxiliary member 70 are not respectively attached to the tips of the pair of arms 30, 40, and FIG. 15 is a side view showing a state during bending of the object W by the above hydraulic actuation device 10.

To bend the object W such as the metal plate by the hydraulic actuation device 10, with the pair of arms 30, 40 opened, the tip portion 36 of the first arm 30 and the tip portion 46 of the second arm 40 are brought close to or brought into contact with the object W. Then, the worker grips the grip portion 84 by the hand and operates the switch 82 by the finger of the hand griping the grip portion 84. Thus, the motor 88 is driven and the hydraulic pump 22 is driven by the motor 88, whereby the piston member 50 moves in the left direction in FIG. 3 and FIG. 14. Thus, as shown in FIG. 15, the arms 30, 40 are moved in the closing directions (i.e., directions to come close to each other). However, at this time, if the surface of the object W is smooth, for example, the tip portion 36 of the first arm 30 slides on the object W, so that it might be impossible to grasp the object W by the tip portion 36 of the first arm 30 and the tip portion 46 of the second arm 40. In this case, as shown in FIG. 15, when the arms 30, 40 are moved in the closing direction, the hydraulic actuation device 10 itself moves in the arrow direction in FIG. 15 (i.e., direction away from the object W), and the object W cannot be grasped by the tip portion 36 of the first arm 30 and the tip portion 46 of the second arm 40. Therefore, the object W cannot be bent. As described above, in the case where the first auxiliary member 60 and the second auxiliary member 70 are not respectively attached to the tips of the pair of arms 30, 40 of the hydraulic actuation device 10, it might be impossible to deform the object W having a smooth surface.

As described above, according to the present embodiment, the first auxiliary member 60 and the second auxiliary member 70 are used as the auxiliary tool to be detachably attached to the tip portions 36, 46 of the pair of arms 30, 40 which are opened/closed by each rotating relative to the base 24 of the actuation device (specifically, hydraulic actuation device 10). In addition, the first auxiliary member 60 is detachably attached to the first arm 30 of the pair of arms 30, 40, and has at least one claw portion 62. Meanwhile, the second auxiliary member 70 is detachably attached to the second arm 40 of the pair of arms 30, 40, and has at least one claw portion 72. The positions of the claw portion 62 of the first auxiliary member 60 and the claw portion 72 of the second auxiliary member 70 are such positions that the claw portion 62 of the first auxiliary member 60 and the claw portion 72 of the second auxiliary member 70 do not come into contact with each other even when the arms 30, 40 are closed in a state in which the first auxiliary member 60 is attached to the first arm 30 and the second auxiliary member 70 is attached to the second arm 40. Thus, if the pair of arms 30, 40 are closed in a state in which the first auxiliary member 60 attached to the tip portion 36 of the first arm 30 and the second auxiliary member 70 attached to the tip portion 46 of the second arm 40 are in contact with the object W, the first auxiliary member 60 and the second auxiliary member 70 do not slide on the object W, and the claw portion 62 of the first auxiliary member 60 and the claw portion 72 of the second auxiliary member 70 grasp the object W, whereby the object W can be bent. In addition, even when the pair of arms 30, 40 are fully closed, the claw portion 62 of the first auxiliary member 60 and the claw portion 72 of the second auxiliary member 70 do not come into contact with each other, and thus the claw portions 62, 72 can be prevented from being worn.

In addition, according to the present embodiment, the claw portion 62 of the first auxiliary member 60 and the claw portion 72 of the second auxiliary member 70 respectively protrude so as to extend in the directions in which the corresponding arms 30, 40 are closed. Thus, when the pair of arms 30, 40 are closed, the object W can be more assuredly grasped by the claw portion 62 of the first auxiliary member 60 and the claw portion 72 of the second auxiliary member 70.

In addition, according to the present embodiment, the first auxiliary member 60 and the second auxiliary member 70 are made from a frictional material. In this case, the first auxiliary member 60 and the second auxiliary member 70 can be more assuredly inhibited from sliding on the object W.

In addition, according to the present embodiment, the first auxiliary member 60 has a pair of claw portions 62 located so as to be away from each other, and the first auxiliary member 60 and the second auxiliary member 70 respectively have the claw portions 62, 72 arranged such that the claw portion 72 of the second auxiliary member 70 enters the recess 64 formed between the pair of claw portions 62 of the first auxiliary member 60 when the pair of arms 30, 40 are closed in a state in which the first auxiliary member 60 is attached to the first arm 30 and the second auxiliary member 70 is attached to the second arm 40. In this case, the claw portions 62 of the first auxiliary member 60 and the claw portion 72 of the second auxiliary member 70 can be assuredly prevented from coming into contact with each other when the pair of arms 30, 40 are fully closed.

In addition, according to the present embodiment, the attachment holes 38, 48 are formed in the tip portions 36, 46 of the pair of arms 30, 40, the attachment pins 66 having the insertion portions 68 to be inserted into the attachment holes 38 are provided to the first auxiliary member 60, and the attachment pins 76 having the insertion portions 78 to be inserted into the attachment holes 48 are provided to the second auxiliary member 70. In this case, the worker can easily attach or detach the first auxiliary member 60 and the second auxiliary member 70 to or from the tip portions 36, 46 of the pair of arms 30, 40 merely by holding the attachment pins 66, 76 by the fingers.

The actuation device according to the present invention is not limited to the above-described structures, and various modifications can be made thereto.

For example, the claw portions 62 provided to the first auxiliary member 60 and the claw portion 72 provided to the second auxiliary member 70 are not limited to the structure shown in FIG. 6 to FIG. 11. For the claw portions 62 provided to the first auxiliary member 60 and the claw portion 72 provided to the second auxiliary member 70, other various structures or shapes can be adopted as long as the claw portion 62 of the first auxiliary member 60 and the claw portion 72 of the second auxiliary member 70 do not come into contact with each other even when the arms 30, 40 to which the first auxiliary member 60 and the second auxiliary member 70 are respectively attached are closed. Specifically, the first auxiliary member 60 may be provided with one claw portion 62, and the position of the claw portion 62 in the width direction of the first auxiliary member 60 and the position of the claw portion 72 in the width direction of the second auxiliary member 70 may be misaligned with each other. The claw portion 62 of the first auxiliary member 60 and the claw portion 72 of the second auxiliary member 70 are not limited to such shapes that protrude so as to extend in the directions in which the corresponding arms 30, 40 are closed.

The first auxiliary member 60 and the second auxiliary member 70 need not be both made from a frictional material.

Only one of the first auxiliary member 60 and the second auxiliary member 70 may be made from a frictional material. Alternatively, both of the first auxiliary member 60 and the second auxiliary member 70 may be made from a material other than a frictional material.

The piston member 50 is not limited to the one to be actuated by pressure oil. In the actuation device according to the present invention, the piston member 50 for opening/closing the pair of arms 30, 40 may be actuated by a motive power source other than the hydraulic pump. For example, the piston member 50 may be directly actuated by the electric motor.

The invention claimed is:

1. An auxiliary tool to be detachably attached to tip portions of a pair of arms which are opened/closed by the rotation of the arms relative to a base of an actuation device, the auxiliary tool comprising:
   a first auxiliary member to be detachably attached to a first arm of the pair of arms, the first auxiliary member having at least one claw portion; and
   a second auxiliary member to be detachably attached to a second arm of the pair of arms, the second auxiliary member having at least one claw portion, wherein
   positions of the claw portion of the first auxiliary member and the claw portion of the second auxiliary member are such that the claw portion of the first auxiliary member and the claw portion of the second auxiliary member do not come into contact with each other even when the arms are closed in a state in which the first auxiliary member is attached to the first arm and the second auxiliary member is attached to the second arm,
   the claw portion of the first auxiliary member and the claw portion of the second auxiliary member protrude from a leading edge of the first auxiliary member or a leading edge of the second auxiliary member, respectively, such that each of the claw portion of the first auxiliary member and the claw portion of the second auxiliary member extends toward a closing direction of the corresponding arms,
   the first auxiliary member has a pair of the claw portions arranged to be separated from each other,
   when the first auxiliary member is attached to the first arm and the second auxiliary member is attached to the second arm, the claw portions are arranged on the first and second auxiliary members, respectively, so that when the pair of arms are closed, the claw portion of the second auxiliary member enters a recess formed between the pair of claw portions of the first auxiliary member,
   the tip portions of the pair of arms have tips with corrugated concavo-convex surfaces, and mounting holes are provided in the tip portions where the first auxiliary member or the second auxiliary member can be attached, so that when the first auxiliary member is attached to the first arm and the second auxiliary member is attached to the second arm, the claw portion is positioned at the tip,
   an attachment pin having an insertion portion to be inserted into the mounting hole is provided in the first auxiliary member, and
   an attachment pin having an insertion portion to be inserted into the mounting hole is provided in the second auxiliary member.

2. The auxiliary tool according to claim 1, wherein the first auxiliary member and the second auxiliary member are each made from a frictional material.

3. An actuation unit comprising:
   an actuation device having a base and a pair of arms which are opened/closed by the rotation of the arms relative to the base; and
   an auxiliary tool to be detachably attached to tip portions of the pair of arms of the actuation device, wherein the auxiliary tool includes
   a first auxiliary member to be detachably attached to a first arm of the pair of arms, the first auxiliary member having at least one claw portion, and
   a second auxiliary member to be detachably attached to a second arm of the pair of arms, the second auxiliary member having at least one claw portion, and
   positions of the claw portion of the first auxiliary member and the claw portion of the second auxiliary member are such that the claw portion of the first auxiliary member and the claw portion of the second auxiliary member do not come into contact with each other even when the arms are closed in a state in which the first auxiliary member is attached to the first arm and the second auxiliary member is attached to the second arm,
   the claw portion of the first auxiliary member and the claw portion of the second auxiliary member protrude from a leading edge of the first auxiliary member or a leading edge of the second auxiliary member, respectively, such that each of the claw portion of the first auxiliary member and the claw portion of the second auxiliary member extends toward a closing direction of the corresponding arms,
   the first auxiliary member has a pair of the claw portions arranged to be separated from each other,
   when the first auxiliary member is attached to the first arm and the second auxiliary member is attached to the second arm, the claw portions are arranged on the first and second auxiliary members, respectively, so that when the pair of arms are closed, the claw portion of the second auxiliary member enters the recess formed between the pair of claw portions of the first auxiliary member,
   the tip portions of the pair of arms have tips with corrugated concavo-convex surfaces, and mounting holes are provided in the tip portions where the first auxiliary member or the second auxiliary member can be attached, so that when the first auxiliary member is attached to the first arm and the second auxiliary member is attached to the second arm, the claw portion is positioned at the tip,
   an attachment pin having an insertion portion to be inserted into the mounting hole is provided in the first auxiliary member, and
   an attachment pin having an insertion portion to be inserted into the mounting hole is provided in the second auxiliary member.

* * * * *